(12) United States Patent
Wazenski

(10) Patent No.: US 6,912,176 B2
(45) Date of Patent: Jun. 28, 2005

(54) ACTIVE ELEMENT ARRAY APPARATUS FOR DISPLACED PHASE CENTER SYSTEMS

(75) Inventor: Michael T. Wazenski, Severna Park, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/695,774

(22) Filed: Oct. 30, 2003

(65) Prior Publication Data

US 2005/0094489 A1 May 5, 2005

(51) Int. Cl.$^7$ ............................................. G01S 15/89
(52) U.S. Cl. ........................................ 367/12; 367/88
(58) Field of Search ..................................... 367/12, 88

(56) References Cited

U.S. PATENT DOCUMENTS

| | | | |
|---|---|---|---|
| 4,244,036 A | | 1/1981 | Raven .......................... 367/88 |
| 4,330,876 A | * | 5/1982 | Johnson ....................... 367/88 |
| 4,987,563 A | * | 1/1991 | Gilmour ....................... 367/88 |
| 5,278,757 A | | 1/1994 | Hoctor et al. ............... 600/459 |
| 5,537,367 A | * | 7/1996 | Lockwood et al. ........... 367/87 |
| 5,667,373 A | * | 9/1997 | Wright et al. ................ 367/124 |

OTHER PUBLICATIONS

"Synthetic Aperture Technique Applied to a Multi–beam Echo Sounder", Asada A. et al., Earth, Planets and Space, Terra Scientific Publishing Co., Tokyo, Japan, Vo. 53, No. 4, pp. 321–326.

"Interferometric Height Estimation of the Seafloor Via Synthetic Aperture Sonar in the Presence of Motion Errors", IEE Proceedings: Radar, Sonar & Navigation, Institution of Electrical Engineers, GB., vol. 147, No. 6, Dec. 1, 2000, pp. 322–330.

* cited by examiner

*Primary Examiner*—Daniel Pihulic
(74) *Attorney, Agent, or Firm*—Birch, Stewart, Kolasch & Birch, LLP

(57) ABSTRACT

A synthetic aperture side looking sonar system which includes an array of active elements, which provide output signals in response to acoustic reflections received from a target area, during travel over the target area. The array has a first section of elements, the output signals of which are used to obtain target information. The array additionally has a second section, including space apart transducers, the output signals of which are used exclusively to determine yaw and sway of the system, as it travels over the target area. Signal processing circuitry, using displaced phase center principles, is provided, and is responsive to the element output signals to derive yaw and sway correction signals for synthetic aperture beam formation.

10 Claims, 4 Drawing Sheets

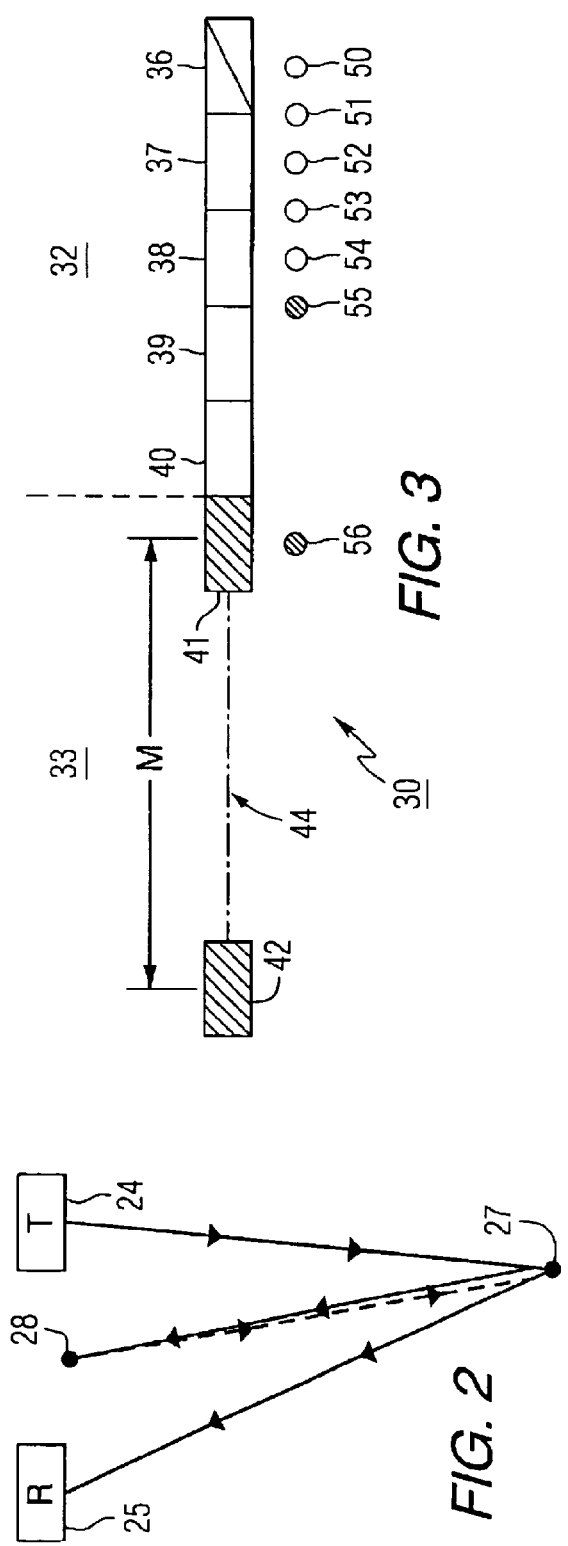
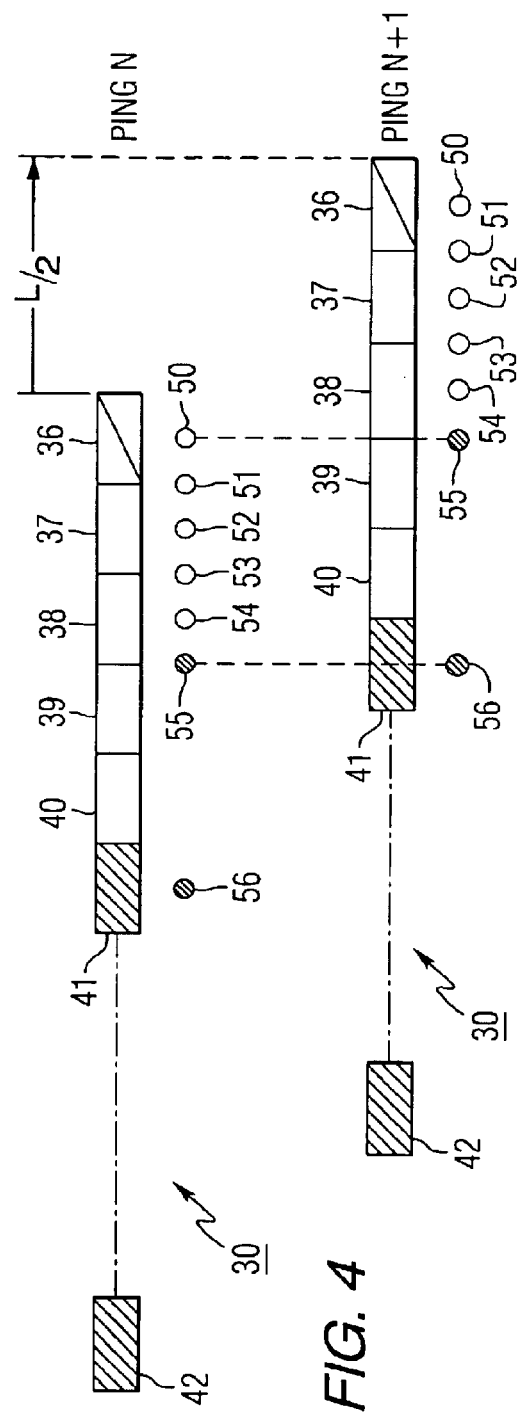
FIG. 2
FIG. 3
FIG. 4

ACTIVE ELEMENT ARRAY APPARATUS FOR DISPLACED PHASE CENTER SYSTEMS

BACKGROUND OF THE INVENTION

1. Field of the Invention

The invention in general relates to sensor systems wherein an array of active elements are mounted on a carrier vehicle, and more particularly to apparatus used in a displaced phase center correction system.

2. Description of Related Art

In a side looking sonar system, a transducer on a carrier vehicle periodically transmits pulses of acoustic energy, laterally of vehicle travel, toward a target area such as the bottom of a body of water. Acoustic energy reflected back from the area impinged by the transmitted pulse, is received by a receiver transducer array on the carrier.

The beam pattern associated with the receiver transducer array is relatively narrow in the direction of carrier travel such that it detects reflected acoustic energy from a relatively narrow strip. The received acoustic energy is processed and may be displayed on a suitable display, or stored for future display.

With each pulse transmission and subsequent reception, a scan line is produced on the display and portrayed as a line by line image that is a pattern of highlights and shadows analogous to an optically viewed panorama illuminated by side-lighting, with objects outlined in such a way as to permit their identification.

It may be shown that increasing the length of the receiver array decreases the receive beam width, thus increasing the along-track resolution and allowing for better identification of certain targets. In a synthetic aperture sonar system a relatively narrow receiver beam with very fine angular resolution may be formed by a relatively short transducer array. This is accomplished by periodically transmitting acoustic pulses (pings) during course of travel over the target area and storing acoustic returns provided by the active elements of the transducer array. After a predetermined number of stored return signals are collected, they are suitably processed to form a single beam with a higher resolution than is possible with the original receiver array.

In such systems in order to achieve accurate results, the carrier vehicle upon which the active elements are mounted must not deviate more than a small fraction of a wavelength (of the acoustic signal) from its defined course. Since this may be impractical, systems exist which determine carrier deviations and correct the processed signals to compensated for such deviations.

One such system is an electronic system which operates on a DPC (displaced phase center) algorithm, such as described in U.S. Pat. No. 4,244,036, hereby incorporated by reference. Basically, by virtue of the transmitter transducer and plurality of receiver active elements, fictitious phase centers are established halfway between the transmitter and each receiver active element. Selected ones of these fictitious phase centers, or equivalent spatial sample locations should overlap from ping to ping in the absence of carrier yaw or lateral movement, called sway. In the presence of yaw (rotation about a vertical axis) and/or sway (lateral movement), deviations in time of arrival of the acoustic return at these selected spatial locations, from ping to ping, are utilized to provide an indication of carrier deviation from its course line, such that suitable correction may be made.

In the typical ocean environment, characterized by high noise and multipath reverberation however, the time of arrival estimation can be corrupted. This is in direct odds with long range high area coverage goals where stringent time delay estimation requirements are needed to estimate yaw motions, particularly for long range applications.

The present invention reduces the effect of noise and interference particularly on yaw estimations.

SUMMARY OF THE INVENTION

Apparatus for obtaining information relative to a target area over which the apparatus travels and projects energy toward the target area in periodic transmission cycles includes an array of active elements having first and second sections with each element providing an output signal in response to energy reflected back from the target area. The second section of elements has first and second spaced apart elements separated by a gap and spaced by a defined distance of M, wherein $M \leq L$, L being the length of the first section of elements.

Signal processing circuitry is provided and includes a computation circuit for computing any yaw and sway of the apparatus during travel, to provide corresponding correction signals. The signal processing circuitry also includes circuitry for generating synthetic aperture signals. The output signals from the elements of the first section are provided to the circuitry which generates the synthetic aperture signals. The output signals from the first and second spaced apart elements of the second section are exclusively provided to the computation circuit which computes yaw and sway, along with the output signal from at least one element of the first section. The correction signals are provided to the circuitry which generates the synthetic aperture signals, to modify the element output signals provided to it, in the presence of any yaw or sway.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein:

FIG. 2 shows two active elements and illustrates the principle of spatial sample locations, or DPCs.

FIG. 3 illustrates an active element array in accordance with one embodiment of the present invention.

FIG. 4 illustrates the array of FIG. 3, along with associated DPCs, at two different ping positions, without any yaw or sway.

DESCRIPTION OF THE PREFERRED EMBODIMENT

Although the present invention is applicable to synthetic aperture and MTI (moving target indication) radar systems, as brought out in the referenced patent, it will be described, by way of example, with respect to a side looking sonar application.

Figure 1:
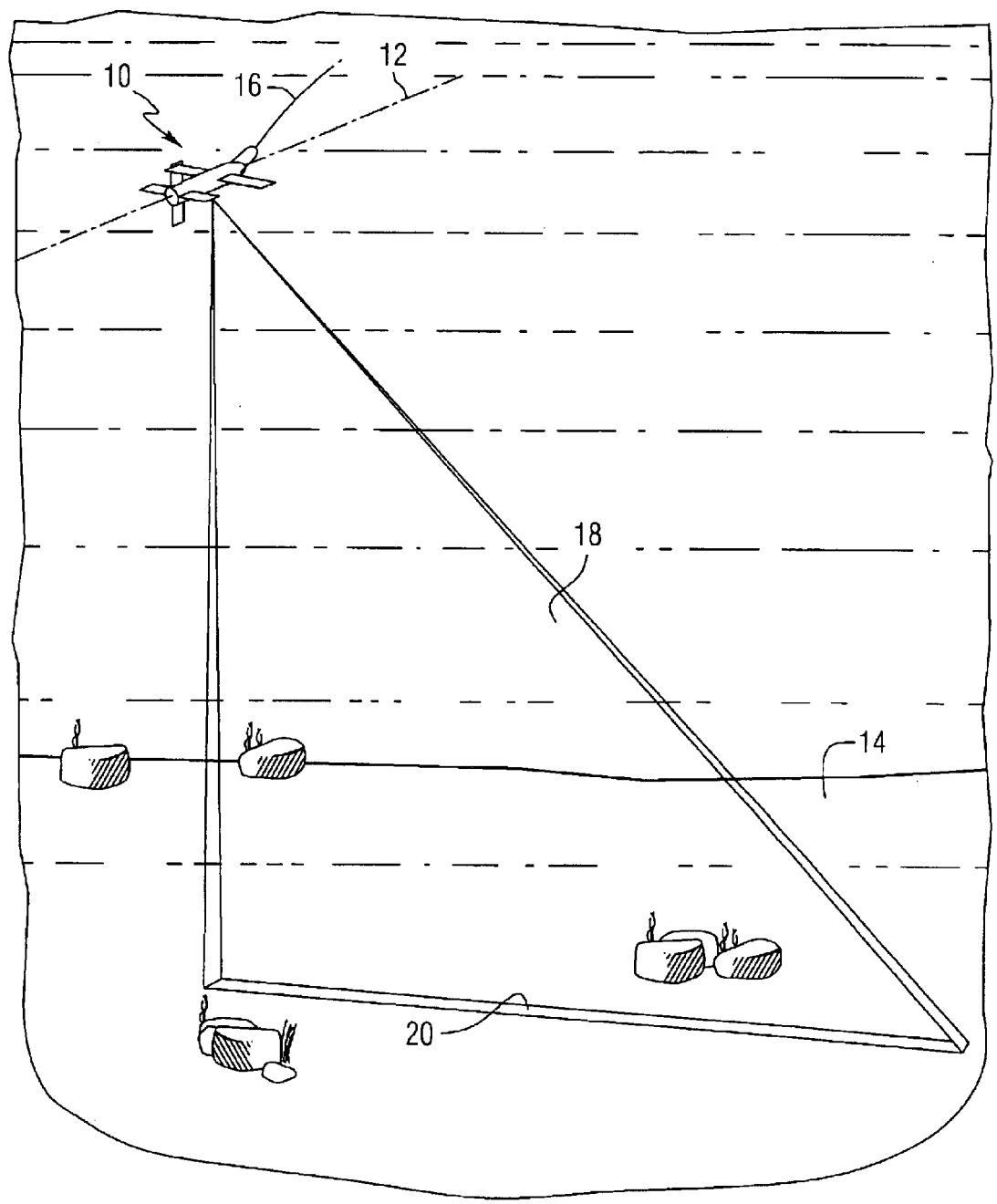
FIG. 1 illustrates a carrier vehicle passing over a target area and further shows a receiver beam associated with the carrier-borne apparatus.

The side looking sonar apparatus may be carried by a manned or autonomous underwater vehicle, or as illustrated in FIG. 1 may be mounted on a towed vehicle 10. Vehicle 10 is pulled along a predetermined course line 12 through the water over a target area 14 by an electromechanical cable 16 connected to a towing craft such as a surface vessel or helicopter (not illustrated).

In a synthetic aperture arrangement, during course of travel, multiple acoustic pings take place and after a predetermined number of receptions, the return signals are processed to form a relatively narrow beam 18 for obtaining target information from narrow strip 20 on the target area 14. The process is continued such that returns from multiple adjacent narrow strips 20 can be used to obtain information about, and/or display the examined target area 14. If the carrier 10 deviates from its prescribed course due to yaw or sway target information will be degraded.

The present invention uses the well known concept of DPCs (displaced phase centers) which may be explained with reference to FIG. 2. In FIG. 2, two active elements 24 and 25 are illustrated with element 24 constituting a transmitting transducer and element 25 constituting a receiver transducer. Transmission of an acoustic pulse by element 24 will impinge on reflector 27 and the reflection will be received by element 25. This operation is identical to transmission and subsequent reception of acoustic energy at point 28, half way between elements 24 and 25. Point 28 is known as an equivalent spatial sample location, or, as utilized herein, as a DPC.

An improved active element array in accordance with one embodiment of the present invention is illustrated in FIG. 3. The array 30 includes a first section 32 and a second section 33. First section 32 includes a plurality of elements 36 to 40, each responsive to acoustic energy returned from a target area to provide corresponding output signals. Although 5 elements are illustrated by way of example, an actual system may include tens of such elements.

The outputs of elements 36 to 40 are utilized to obtain target information, which generally includes displaying an image of the target area. In addition, as will be seen, the output of element 36 is also used in a computation process for obtaining an indication of yaw and sway.

Second section 33 includes two elements 41 and 42, spaced apart by a defined distance M, as measured from the center of the elements, thereby defining a gap 44. If the length of the first section 32 is L, then for all cases M≦L. The outputs of the two elements 41 and 42 are not utilized to obtain target information, as are elements 36 to 40, but rather, are used exclusively in the computational process to determine yaw and sway.

Associated with the array of elements are corresponding DPCs. Although a separate transmitting transducer may be used, for the example, element 36 will also be used as a transmitter for projecting a relatively wide beam of acoustic energy toward the target area. With element 36 as the transmitter, there exists corresponding DPCs 50 to 56 in the positions illustrated. A gap exists between DPCs 55 and 56 corresponding to a distance of M/2.

During operation, acoustic transmissions are made each time the first section 32 has traveled half its length. For example, FIG. 4 illustrates the elements and DPCs of the array 30 at a first position where ping N takes place. After travel by ½ the length of section 32, that is 2½ element lengths, ping N+1 takes place. Assuming that there is no sway or yaw, DPC 55 of ping N+1 would overlap DPC 50 of ping N, and DPC 56 of ping N+1 would overlap DPC 55 of ping N. For clarity, the position of the DPCs in the two pings are shown one below one other, it being understood that they would actually lie along the same line, as would the elements 36 to 42.

Figure 5:
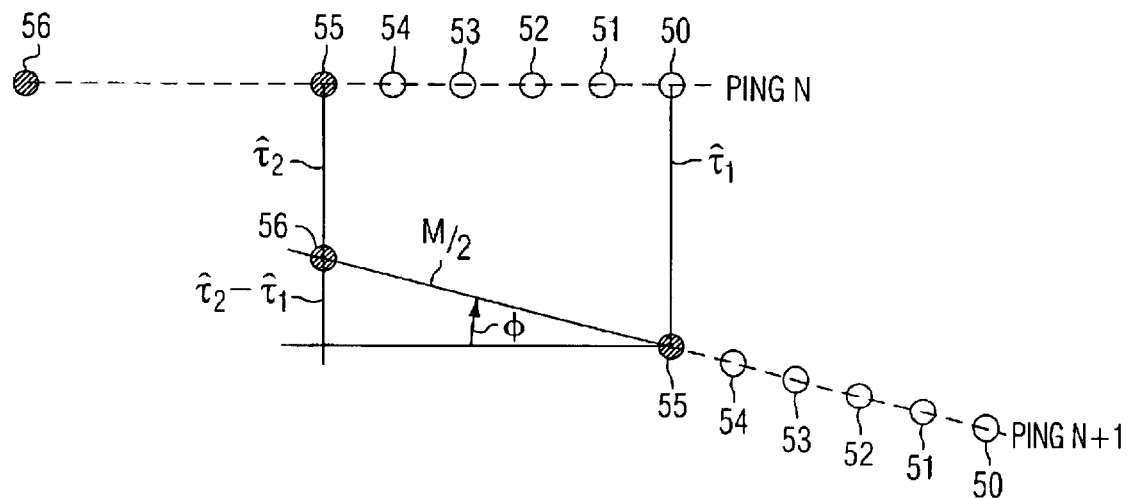
FIG. 5 illustrates the DPCs of the array of FIG. 3, for two ping positions, in the presence of yaw and sway.

If, however there is sway and yaw, the relative positions of the DPCs on sequential pings would be as illustrated in FIG. 5 (which does not show the elements 36 to 42). In the absence of yaw and sway the signals from successive pings should correlate between DPCs 55 and 56 and between DPCs 50 and 55, from ping N to ping N+1. However, in FIG. 5, where yaw rotation is assumed to be about DPC 55, there would be time delays $\hat{\tau}_1$ and $\hat{\tau}_2$ denoting the respective measured time delay differences between DPCs 55 and 50 and DPCs 56 and 55, due to the yaw and sway. In FIG. 5 the measured yaw angle is denoted by $\hat{\Phi}$.

Due to the presence of noise and reverberation, the measured time differences include an error factor. That is:

$$\hat{\tau}_1 = t_1 + \epsilon_1 \qquad \text{eq. (1)}$$

$$\hat{\tau}_2 = t_2 + \epsilon_2 \qquad \text{eq. (2)}$$

where $t_1$ and $t_2$ are the actual time delays and $\epsilon_1$ and $\epsilon_1$ are the error factors.

The corresponding physical distance represented by the time delays may be obtained by a multiplication by the speed of sound in water, C, such that from geometry the nominal yaw angle may be defined by:

$$\sin\hat{\Phi} = \frac{C\hat{\tau}_2 - C\hat{\tau}_1}{\frac{M}{2}} \qquad \text{eq. (3)}$$

Substituting eqs. (1) and (2) and factoring and rearranging:

$$\sin\hat{\Phi} = \frac{2C((t_2 + \varepsilon_2) - (t_1 + \varepsilon_1))}{M} \qquad \text{eq. (4)}$$

Eq. (4) may be separated into actual and error components:

$$\sin\hat{\Phi} = \frac{2C(t_2 - t_1)}{M} + \frac{2C(\varepsilon_2 - \varepsilon_1)}{M} \qquad \text{eq. (5)}$$

The nominal yaw angle also includes an actual and error component:

$$\sin \hat{\Phi} = \sin(\Phi + \Phi_{err}) \qquad \text{eq. (6)}$$

In an actual operating system, the mass of the array carrier is large and the time between pings is small such that the actual yaw is generally no greater than around 0.1 degree. For these small angles the sin of the angle is approximately equal to the angle (in radians); that is:

$$\sin \hat{\Phi} \approx \hat{\Phi} \qquad \text{eq. (7)}$$

The nominal yaw angle $\hat{\Phi}$ has an actual, as well as an error component as follows:

$$\hat{\Phi} \approx \Phi + \Phi_{err} \qquad \text{eq. (8)}$$

The components of eq. (8) in terms of actual time is:

$$\Phi = \frac{2C(t_2 - t_1)}{M} \qquad \text{eq. (9)}$$

which is the true, or actual yaw.
and in terms of error is:

$$\Phi_{err} = \frac{2C(\varepsilon_2 - \varepsilon_1)}{M} \qquad \text{eq. (10)}$$

which is the yaw error.

It may be seen from eq. (10) therefore that the yaw error is inversely proportional to the separation between DPCs 55 and 56, indicative of the separation between array elements 41 and 42 (FIG. 3). That is, the greater the distance M the less will be the error introduced into the computation of yaw. For maximum benefit, M (the defined distance between elements 41 and 42)=L (the length of the array elements uses for obtaining target information).

Although yaw determination is significantly enhanced, the sway determination remains the same and is merely the distance between DPCs 50 and 55 on successive pings, and is estimated by multiplying the speed of sound in water, C, by the time delay $\tau_1$.

Figure 6:
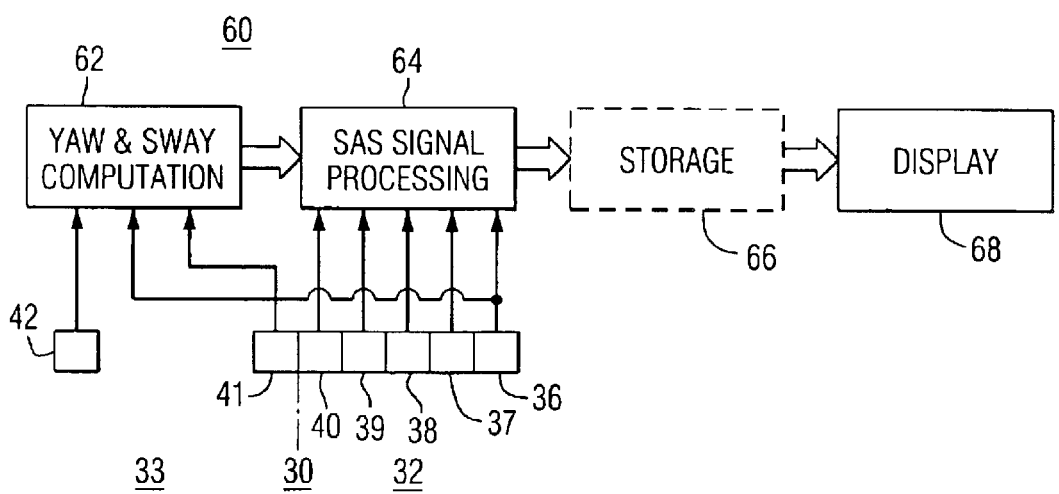
FIG. 6 is a simplified block diagram of signal processing apparatus for processing the active elements outputs.

FIG. 6 illustrates a simplified block diagram of the processing of the element output signals. Signal processing circuitry 60, which receives the output signals from elements 36 to 42, includes a yaw and sway computation circuit 62 which calculates yaw and sway and provides these values to synthetic aperture sonar signal processing circuit 64 which, in response to these values, corrects the element output signals and accumulates the corrected element signals from a predetermined number of pings to form synthetic aperture beams. The yaw and sway computation circuit 62 may be similar to that described in the referenced patent and the synthetic aperture sonar signal processing circuit 62 may be similar to that in current use.

The synthetic aperture sonar signals may be examined concurrently while the apparatus travels over a target area, or may be stored for future use. Storage device 66 may be included for this purpose. The synthetic aperture sonar signals may be operated on by a computer program for detection of predetermined targets, or, as illustrated in FIG. 6, may be provided to a display 68 for visual presentation of the target area.

Figure 7:
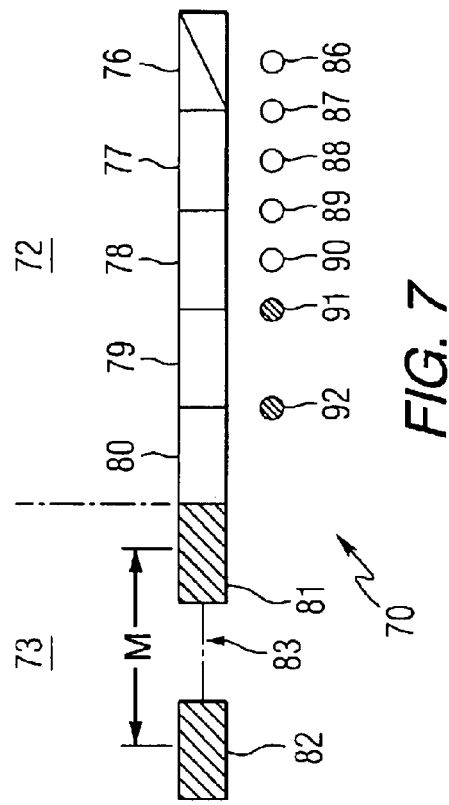
FIG. 7 is an alternate embodiment of an array of the present invention.

FIG. 7 illustrates another embodiment of the present invention wherein M<L. More particularly, array 70 includes a first section 72 comprised of elements 76 to 80 which are used to obtain target information, and a second section 73 comprised of elements 81 and 82 used exclusively in the determination of yaw and sway.

Figure 8:
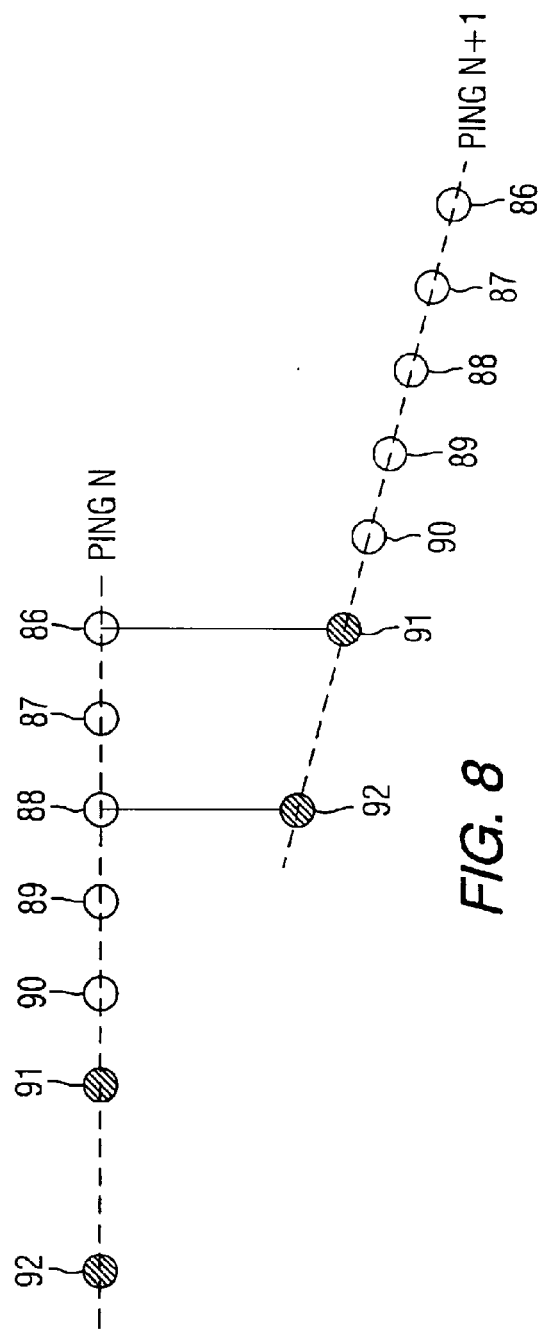
FIG. 8 illustrates the DPCs, as in FIG. 5, for the embodiment of FIG. 7.

If the length of the first section is L, in the embodiment of FIG. 7, the defined distance M between elements 80 and 81 is less than L. This spacing alters the DPCs involved in yaw and sway computation. More particularly, FIG. 8 illustrates the corresponding DPCs for ping N and for ping N+1 in the presence of yaw and sway. With the distance L/2 traveled between pings, the DPCs 91 and 92 used solely for yaw and sway computation line up with DPCs 86 and 88 associated with target information. In such case, the outputs of both elements 76 and 78 (FIG. 7) would be provided to yaw and sway computation circuit 62 (FIG. 6).

With the present invention, greater accuracy in yaw determination is made and this determination may be accomplished without a fully populated array. In an actual array using a multitude of elements, the elimination of possibly tens of elements, together with their associated signal processing circuitry represents not only a weight savings but a cost savings as well. In addition, where space permits, the accuracy of an existing array may be improved with the mere addition of a single element displaced from the existing elements.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for obtaining information relative to a target area over which the apparatus travels and projects energy toward the target area in periodic transmission cycles, comprising:

an array of active elements having first and second sections with each said element providing an output signal in response to energy reflected back from said target area;

said first section of elements having a length L;

said second section of elements having first and second spaced apart elements separated by a gap and spaced by a defined distance of M, wherein M≦L;

signal processing circuitry including a computation circuit for computing any yaw and sway of said apparatus during said travel, to provide corresponding correction signals;

said signal processing circuitry also including circuitry for generating synthetic aperture signals;

the output signals from said elements of said first section being provided to said circuitry which generates said synthetic aperture signals;

the output signals from said first and second spaced apart elements of said second section being exclusively provided to said computation circuit which computes yaw and sway;

the output signal from at least one element of said first section also being provided to said computation circuit which computes yaw and sway;

said correction signals being provided to said circuitry which generates said synthetic aperture signals, to modify the signals provided to it in the presence of any yaw or sway.

2. Apparatus according to claim 1 wherein:

said distance M is equal to said length L of said first section.

3. Apparatus according to claim 1 wherein:

said distance M is less than said length L of said first section; and wherein the output signal from two elements of said first section are provided to said computation circuit which computes yaw and sway.

4. Apparatus according to claim 1 wherein:

one of said elements of said array is also operable to project said energy toward said target area.

5. Apparatus according to claim 1 wherein:

said energy is projected toward said target area each time said first section travels half its length.

6. Apparatus according to claim 1 wherein:

said travel is through a water environment; and said elements are sonar transducers.

7. An array for use in a synthetic aperture system, comprising:

a plurality of active elements extending along a line;

said plurality of elements including first and second connected sections of active elements, and wherein said first section is a fully populated section of elements and said second section is a non-fully populated section of elements, said second section including an end element which is displaced from the remainder of said elements in said second section by a gap of at least one element.

8. An array for use in a synthetic aperture system, comprising:

first and second sections of active elements;

said first section comprising a fully populated section of active elements including a plurality of mutually adjacent elements; and wherein said second section contacts said first section and comprises a non-fully populated section of active elements including first and second elements separated by a gap of one or more elements.

9. An array according to claim 8 wherein:

said first section of active elements has a length L;

said second section of active elements has a defined length M; and wherein $M \leq L$.

10. An array according to claim 8 wherein said first element comprises the first numbered element in said second section of active elements and said second element comprises the last numbered element in said second section of active elements.

* * * * *